United States Patent Office 3,033,755
Patented May 8, 1962

3,033,755
PROCESS FOR REMOVING THE WATER SOLUBLE MATERIALS FROM A KERATIN STRUCTURE AND COSMETIC OR PHARMACEUTICAL PRODUCT FORMED THEREFROM
Otto Karl Jacobi, Wiesbaden-Igstadt, Germany, assignor to Kolmar Laboratories, Inc., Milwaukee, Wis., a corporation of Delaware
No Drawing. Filed Apr. 14, 1961, Ser. No. 102,935
13 Claims. (Cl. 167—90)

This invention relates to a process for removing the water soluble materials from a keratin structure and for employing the extraction as an additive in a cosmetic or pharmaceutical product. This application is a continuation-in-part of the copending applications of the same invention, Serial No. 686,593, filed September 27, 1957; Serial No. 688,433, filed October 7, 1957; and Serial No. 691,538, filed October 22, 1957, all of which are now abandoned.

The epidermis or outer layer of skin is composed of two main layers, the stratum granulosum and the stratum corneum, which is located superficial to the stratum granulosum and is separted therefrom by a transparent layer of cells called the stratum lucidum. The innermost layer of the epidermis is a single row of cells which continually divide to replace the corneum layer as the same is worn away. The cells gradually die as they move outwardly to the corneum, and the corneum itself, is essentially dead skin consisting mostly of keratin, which is a protein material.

The corneum layer protects the granulosum layer and prevents the granulosum layer from drying out. Under normal skin conditions, the corneum layer contains about 10% to 30% water which gives the skin its elasticity. The lucidum layer, which separates the corneum and the granulosum layer, permits the passage of water vapor between the two layers but prevents the outward passage of liquid water from the granulosum layer and thereby prevents the granulosum layer from losing its water content. The corneum, however, allows the evaporation of water vapor passing outwardly from the granulosum layer through the lucidum layer.

By the procedure of keratinization by which the skin cells are constantly reproduced, a fat-like material is produced in the granulosum layer which is disposed between the layers of keratin in the corneum and serves as an insulator and a lubricant. The fat material developed in the granulosum layer differs from the fat produced by the sebaceous glands which are located on the hair roots in the dermis layer of the skin. The sebaceous glands secrete fat into the hair ducts and this fat material passes through the hair openings and lubricates the hair on the skin surface. In addition to the sebaceous fat, depot fat is also present in the inner layers of skin.

When the corneum layer of the skin loses its natural water content the skin becomes dry and scaley in appearance. It has been the theory in the past that the skin becomes dried out due to the loss of the fat materials in the corneum and therefore many cosmetic and pharmaceutical products in the past have attempted to eliminate the dry skin problems by superfatting the cosmetic products. In this regard, materials, such as lanolin and other fat base substances, have been added to the cosmetics in an attempt to introduce fat materials to the corneum layer of the skin.

More recently, it has been shown that dry skin is not caused by the loss of the fat material in the corneum layer but rather by the loss of the water soluble constituents in the corneum layer. It has been found that the keratin which forms the essential constituent of the corneum layer of the skin, when separated from the water soluble materials normally present therein, will absorb water vapor but will not absorb liquid water. While the keratin is hygroscopic and will absorb water vapor, the water vapor will not be held for any length of time and will be given up very quickly to the surrounding atmosphere. Therefore, the corneum layer of human skin which has lost the water soluble material will be relatively hydrophobic and will not retain water vapor. Thus, the corneum layer will tend to dry out quickly and the skin will lose its moist appearance and become dry and scaly.

The present invention is directed to a process for extracting the water soluble materials from keratin and utilizing the extraction as an ingredient in a cosmetic or pharmaceutical product in order to increase the moisture absorption and retaining ability of the skin. The extracted material is compatible with the skin and adsorbed by the skin surface. As the material is hygroscopic by nature, it tends to absorb water from body perspiration, water vapor from the atmosphere, water vapor which passed through the lucidum layer to the corneum or water contained in the cosmetic base, and lowers the surface tension of the water so that moisture is restored to the corneum cells. The skin will then take on a moist appearance.

More specifically, the process consists of initially extracting the water soluble or water and polar solvent soluble material from the keratin structure. The fat and wax materials are then removed from the water solution by extraction with a fat and wax solvent and the solution is neutralized to a pH in the range of 7.0 to 7.5 to precipitate the sulphur containing compounds and other skin irritating materials in the solution.

The solution is concentrated and subsequently dissolved in a solvent which is compatible with the cosmetic base to be employed and this solution is then mixed with the cosmetic base.

The keratin extract, when employed in a cosmetic or pharmaceutical base, is compatible with the skin and is readily adsorbed by the skin and readily adsorbs and retains moisture to provide the skin with a more balanced intake and output of moisture.

The keratin extraction to be employed in the process of the invention is derived from a keratin structure such as animal horns, hair, nails, hoofs or stratum corneum of the skin. In the case of animal hair, the sebaceous fat is initially removed from the hair by conventional procedures. The composition of the water soluble keratin extraction has not been definitely established, for it is a complex mixture of a multitude of compounds including polypeptides, glucopeptides, amino acids, urea, lactic acid, citric acid and salts of sodium, potassium, calcium and magnesium. The total nitrogen content of the extraction is generally in the range of 13 to 15% by weight and the amount of free acids, calculated as lactic acid, is in the range of 3 to 5% by weight of the material.

The percentage of amino acids in the extraction of the keratin strurture is in the range of 7 to 14% and the polypeptides and glucopeptides compose between 60 and 70% of the extraction. Due to the complexity of the material, the specific percentages of the various ingredients cannot be fully ascertained. In addition, there is about 10% of unidentified material present in the extraction.

According to the invention, the keratin material is initially ground to a finely divided condition and mixed with an excess of either water or a water solution of a polar solvent. The polar solvent may take the form of ethyl alcohol, methyl alcohol, iso propyl-alcohol, acetone, dioxane or any other solvent which is miscible with water. Generally, the water or aqueous solution of the polar solvent is employed in a ratio of about 7 to 10 parts of solution to one part by weight of the keratin material.

The mixture is refluxed at a temperature below 60° C. and generally in the range of about 40° to 60° C. for a period of time sufficient to extract the water and polar solvent soluble material from the keratin. The refluxing period may generally be in the range of 6 to 12 hours.

After the refluxing, the solution is separated from the solid materials by filtration and the polar solvent, if employed, is removed from the water solution by distillation. The water solution is mixed with approximately an equal volume of a fat and wax solvent to extract the fat and waxes from the water solution. The fat and wax solvent is a solvent which is not miscible with water and which will dissolve the wax and fat materials in the solution. The solvent may take the form of any conventional fat and wax solvent, such as ether, chloroform, carbon tetrachloride, methyl chloride or the like.

The fat extraction may either be carried on at room temperature or the materials may be refluxed at a temperature of 40° to 60° C. It is important that the temperature of the refluxing be maintained under 60° C. in order to prevent decomposition of the protein material in the solution.

The fat solvent with the dissolved fat and wax material is then separated from the water solution by use of a separation funnel. The pH of the water solution at this time is generally in the range of 4.0 to 5.0.

After removal of the fat solvent, the water solution is neutralized by adding an alkaline material to the solution to bring the pH up to a range of 7.0 to 7.5. Any conventional alkaline material may be employed to raise the pH, and it has been found that ammonium hydroxide is particularly suitable because the pH is easily controlled by use of this material. Other stronger alkaline materials, such as sodium hydroxide, may be employed, but the pH is more difficult to control because of the strength of the material.

As the water solution contains small amounts of materials that will not dissolve in an acidic media, the pH of the solution can be raised, before neutralization, to a value of about 9.0 to dissolve this material. Then, the pH is lowered to the range of 7.0 to 7.5 by the addition of a suitable acidic material, such as acetic acid.

It has been discovered that by the neutralization process, the sulphur containing materials and other skin irritating compounds are precipitated from the water solution. The exact composition of thte sulphur containing materials is not known, for they are a complex mixture of ingredients. However, by raising the pH to 7.0 to 7.5, it has been found that these sulphur containing materials will precipitate from the solution and can be removed. With the removal of the skin irritating materials, the keratin extraction can be readily incorporated with a cosmetic or pharmaceutical base.

After separation of the precipitated sulphur containing materials by filtration or the like, the resulting solution is concentrated by evaporation and the concentrate is then usually dissolved in a solvent which is compatible with the cosmetic base to be employed. The keratin extraction is employed in an amount of 1.0% to 95% by weight of the cosmetic or pharmaceutical base. If the keratin extraction of the invention is to be employed in a tonic, such as an after-shave lotion, the concentrated extraction is dissolved in about 70 to 80% by weight of alcohol and the alcohol solution is then mixed with water and perfume compounds to form the lotion.

With a lipstick or similar wax base material, the keratin extraction of the invention is dissolved in a glycol, glycerine or mono glyceride and the resulting solution is mixed with the waxes and other ingredients of the lipstick.

If the keratin extraction is to be employed in a cream or ointment which contains water, the extraction is initially dissolved in water and the solution is then employed in the cream base. If the cream does not contain water, the keratin extraction is initially dissolved in a material, such as glyceride or lanolin, and the resulting solution is then employed in the cream base.

The water soluble keratin extraction or moisturizing material of the invention can also be combined with a horn fat in a cosmetic or pharmaceutical product.

The horn fat is the fat and wax extraction from horn-like materials, such as horns, hoofs, hair or skin of animals. In case hair is used, the hair is first treated to remove the sebaceous fat using any conventional procedure utilized to make lanolin. As in the case of the moisturizing material, the precise chemical structure of the horn fat is not known. Essentially, however, the horn fat consists of cholesterol esters with fatty acids, such as stearic acid and palmitic acids, and fatty acid esters of straight chain fatty alcohols with the above mentioned esters. The horn fat differs from sebum and lanolin, which are also wax-like materials, in that the horn fat has a higher content of cholesterol esters and free cholesterine. However, as previously pointed out, the specific composition of horn fat has not been fully ascertained.

To prepare the horn fat, the cleaned and ground horn or keratin structure is extracted with a non-polar fat and wax solvent, such as ether, chloroform, methyl chloride, ethylene dichloride, difluoromethane, iso-octane, methyl cyclohexane, 2-dimethyl-butane, benzene, toluene, diethyl benzene, petroleum ether, or the like. In this regard, an excess of the non-polar solvent is added to the ground keratin structure and refluxed at a temperature approximating the boiling temperature of the solvent employed. Generally, the refluxing is carried on for a period in the range of 2 to 3 hours.

After refluxing, the non-polar solvent is separated from the solid material by filtration and the solvent is then distilled off, with the distillate being the horn fat material. The horn fat is a very viscous oil at 29° C. and is a semi-solid oil at 20° C.

Alternately, the moisturizing material and horn fat can be obtained in a single extraction operation. In this case, the keratin structure is refluxed with a mixture of about 30% to 40% of a polar solvent, 30% to 40% of a non-polar solvent and the balance water. After filtering, the solvents and water are distilled off, leaving the moisturizing material and horn fat.

The combination of the water soluble extraction from the keratin structure and the fat or wax extraction from the keratin structure is employed in a cosmetic or pharmaceutical composition in an amount of 0.5% to 95% by weight of the composition. For the most desirable moisture absorbing and retaining characteristics, the water soluble extraction is employed in an amount of 5% to 95% by weight of the total weight of the water soluble extraction and the fat extraction. The materials can be mixed together in a form of a suspension or dispersion and the suspension is then added to either the water phase or the wax phase of the particular cosmetic product to be employed.

Alternately, the water soluble extraction and the horn fat can be added separately to the cosmetic product. In this regard, the water soluble extraction is initially dissolved in the water phase material of the cosmetic product and the horn fat is dissolved in the wax phase. The two solutions are then added in the desired proportion to the other cosmetic ingredients.

The water soluble keratin extraction or moisturizing material may also be employed in a soap or detergent in an amount of 0.1% to 75% by weight of the soap or detergent. The keratin extraction is usually added to the soap or detergent in a water solution containing about 10% to 50% by weight of the extraction. The extraction can be added to any conventional soap, detergent or other cleansing compound generally employed for cleaning the human skin or any cleansing compound which may contact human skin in its use.

The soap to which the keratin extraction is added can be any conventional toilet or laundry soap. The soaps generally are the sodium or potassium salts of a fatty acid or mixtures of fatty acids having from 12 to 18 carbon atoms in the molecule. The soap may take the form of sodium laurate, potassium laurate, sodium myristate, potassium myristate, sodium stearate, potassium stearate, sodium palmitate, the sodium or potassium salts of cocoanut and peanut oil, or the like, or mixtures thereof.

The detergent to which the keratin extraction is added may take the form of any of the conventional type of detergents. Examples of detergents that may be employed are lauryl sulfate, sulfated peanut oil, sulfated cetyl alcohol, iso-propyl naphthaline sulfate, di-isobutyl sulphonic acid, sulfonated dioctyl ester of sodium sulfosuccinic acid, sulfated stearyl alcohol, diglycol laurate, sulfonated mineral oil, ethylene oxide oleate, proteinoleic acid condensate, sorbitol ricinoleic ester sulfate, myristic-acid-triethanol-amine condensate, paraffin oil sulfochloride, and the like.

The keratin extraction prepared as described above, can be added to the soap during any desired time in the soap manufacture. For example, in the manufacture of soap, a hot alkaline solution is added to the warm fatty acid to build the soap. The soap, which is a warm liquid at this time, is then either poured into molds to form large slabs which are subsequently cut into bars, or the liquid soap can be poured on a roller mill to be made into chips. The chips are subsequently dried and added to a roller mill with perfume and color and milled until an event distribution of the ingredients is obtained. The resulting mass is then extruded and cut into bars. To provide the soap composition of the invention, a water solution of the keratin extraction can be added either to the liquid soap prior to the time it is poured into the molds, or it can be added to the soap chips in the roller mill operation.

When using the keratin extraction in a liquid soap, an aqueous solution of the extraction is added to the liquid soaps.

In regard to the addition of the keratin extraction to detergents, the conventional practice of making the detergent is to mix the detergent solution with water to form a slurry, and the slurry is subsequently sprayed into a stream of warm air to evaporate the water and produce the detergent particles. The keratin extraction is added to the slurry of the detergent prior to atomizing the same.

EXAMPLE NO. 1

100 grams of ground cow's hoofs were mixed with 1000 grams of water and refluxed at 55° C. for a period of 8 hours. The water solution was separated from the solid material by filtration and an equal volume of carbon tetrachloride was mixed with the water solution and subsequently refluxed at 50° C. for 5 hours. The carbon tetrachloride was separated from the water solution by use of a separation funnel.

Ammonium hydroxide was then added to the water solution until the pH of the solution was raised to 9.0. The pH was then lowered to approximately 7.2 by the addition of acetic acid to the solution. With the lowering of the pH to 7.2, the sulphur containing compounds precipitated and were separated from the clear solution by filtration. The solution was then concentrated by evaporation to approximately a 70° solids solution and the concentrated solution was then dissolved in 75% ethyl alcohol. The resulting alcohol solution of the keratin extraction was employed as an after-shave tonic having the following composition in weight percent:

| | |
|---|---|
| Aluminum lactate | 0.5 |
| Menthol | 0.2 |
| Glycerine | 1.3 |
| Alcoholic keratin extract solution | 60.0 |
| Distilled water | 38.0 |

EXAMPLE NO. 2

200 grams of finely divided stratum corneum of cattle were mixed with 2000 grams of 80% methanol and refluxed at 50° C. for a period of 7 hours. The water solution was separated from the solvent mass by filtration and the alcohol was removed from the water solution by distillation. An equal volume of ethyl ether was then mixed with the water solution and refluxed at 40° for 6 hours. The ether was separated from the water solution after the refluxing by a separation funnel.

The pH of the water solution was raised to a value of 7.3 by the addition of ammonium hydroxide. The neutralization of the water solution resulted in the precipitation of the sulphur containing materials from the solution.

The precipitate was filtered and the remaining solution was concentrated by evaporation to approximately an 85% solution and the resulting solution was then dissolved in 10 parts of propylene glycol to one part by weight of the solution. The glycol solution was then added as an ingredient in a lipstick composition and having the following formula in weight percent:

| | |
|---|---|
| Stearic ricinoleate | 60.5 |
| Ceresin | 11.0 |
| Beeswax | 11.0 |
| Bromo acids | 5.5 |
| Colors | 7.0 |
| Keratin extract-propylene glycol solution | 5.0 |

EXAMPLE NO. 3

The keratin extract was prepared in the manner set forth in Example No. 1. After concentration of the material to a 90% solution, the concentrate was dissolved in 99 parts of water to one part of the concentrated solution and the resulting water solution was employed as an ingredient in a cosmetic cream having the following composition in weight percent:

| | |
|---|---|
| Beeswax | 13 |
| Spermacetti | 2 |
| Vaseline | 10 |
| Peanut oil | 20 |
| Sesame oil | 20 |
| Borax | 1 |
| Keratin extract-water solution | 34 |

EXAMPLE NO. 4

The keratin extraction was prepared in the manner set forth in Example No. 2, and concentrated by evaporation to a 50% solution. The concentrated solution was then dissolved in 50 parts of lanolin to one part of the concentrated keratin extract and the resulting lanolin solution was employed in a cosmetic cream having the following composition in weight percent:

| | |
|---|---|
| Stearic acid | 6 |
| Keratin extract-lanolin solution | 6 |
| Beeswax | 8 |
| Paraffin oil | 32 |
| Triethanolamine | 2 |
| Distilled water | 46 |

EXAMPLE NO. 5

The keratin extraction prepared as in Example No. 1 was concentrated and 2 grams of the concentrated extraction were mixed with 8 grams of ethyl alcohol. The resulting solution was incorporated in a face powder having the following formula in weight percent:

| | |
|---|---|
| Talc | 70.0 |
| Zinc oxide | 4.5 |
| Zinc stearate | 4.8 |
| Rice starch | 10.0 |
| Perfume | 0.5 |
| Color | 0.2 |
| Ethyl alcohol-keratin extraction solution | 10.0 |

EXAMPLE NO. 6

10 grams of the concentrated keratin extraction prepared in the manner set forth in Example 1 were mixed with 10 grams of sulfonated castor oil and the mixture was incorporated in a bath oil having the following composition in weight percent:

| | |
|---|---|
| Sulfonated castor oil | 65.0 |
| Keratin extraction-sulfonated castor oil mixture | 20.0 |
| Perfume | 15.0 |

EXAMPLE NO. 7

Dry concentrated keratin extraction prepared as in Example No. 2 was incorporated in an anti-sunburn cream having the following composition in weight percent:

| | |
|---|---|
| Beeswax | 18.0 |
| Liquid paraffin | 40.0 |
| Sunscreen | 10.0 |
| Water | 29.0 |
| Dry keratin extraction | 2.0 |
| Borax | 1.0 |

EXAMPLE NO. 8

2 grams of concentrated keratin extraction prepared as set forth in Example No. 2 were mixed with 87.8 grams of water and the resulting solution was incorporated in a hair fixative having the following composition in weight percent:

| | |
|---|---|
| Gum tragacanth | 1.0 |
| Alcohol | 6.0 |
| Castor oil | 2.0 |
| Glycerine | 1.0 |
| Preservative | 89.2 |
| Water solution of keratin extraction | 0.2 |

EXAMPLE NO. 9

2 grams of the water soluble keratin extraction prepared as in Example No. 1 were mixed with 46 grams of acetone and the mixture was incorporated in a nail varnish having the following composition in weight percent:

| | |
|---|---|
| Nitrocellulose | 12.0 |
| Butyl stearate | 5.0 |
| Aryl acetate | 25.0 |
| Ester gum | 5.0 |
| Pigment | 5.0 |
| Keratin extraction acetone mixture | 48.0 |

EXAMPLE NO. 10

1000 grams of finely divided cattle horns were mixed with 10,000 grams of water and refluxed for 8 hours at 50° C. After this refluxing period, the water solution was filtered from the solids and 100 parts of the filtrate were mixed with 1000 parts of carbon tetrachloride to extract the fat and wax materials from the water solution. This mixture was refluxed at 45° C. for 6 hours.

After the refluxing, the water solution was separated from the carbon tetrachloride by a separation funnel. The water solution was then neutralized with ammonium hydroxide to bring the pH of the solution up to a value of 7.2. After neutralizing and filtering the solution, the solution was concentrated to remove the water. The resulting moisturizing material concentrated solution had a brown color and had a consistency of tar.

To extract the horn fat, 700 grams of clean and finely divided cow hair free of sebaceous fat were mixed with 8000 grams of chloroform and refluxed for 10 hours at a temperature of 55° C. The chloroform was then removed from the solid material by filtration and the resulting solution was then distilled to remove the solvent, leaving the horn fat which was a very viscous oil having a dark brown color.

5 grams of the water soluble moisturizing material were mixed with 10 grams of the horn fat. The resulting mixture was a finely divided dispersion and was then added to 64.9 grams of water. The resulting dispersion was employed in a lotion having the following composition in weight percent:

| | |
|---|---|
| Stearic acid | 1.5 |
| Potassium hydroxide | 0.2 |
| Quince seed | 1.0 |
| Karaya gum | 15.0 |
| Glycerine | 0.5 |
| Cetyl alcohol | 1.1 |
| Lanolin | 0.5 |
| Perfume | 0.1 |
| Preservative | 0.1 |
| Moisturizing material-horn fat dispersion | 80.0 |

EXAMPLE NO. 11

500 grams of cleaned and ground cattle hoofs were mixed with 3000 grams of benzene, 1000 grams of ethyl alcohol and 200 grams of water and refluxed at a temperature of 40° C. for 8 hours. The resulting solution was filtered from the solid material and distilled. The residue was a mixture of about 90% moisturizing material and 10% horn fat and was a very viscous oily material with a brown color.

2 grams of the residue were mixed with 8 grams of ethyl alcohol and the resulting mixture was employed in a face powder having the following composition in weight percent:

| | |
|---|---|
| Talc | 70.0 |
| Zinc oxide | 4.5 |
| Zinc stearate | 4.8 |
| Rice starch | 10.0 |
| Perfume | 0.5 |
| Color | 0.2 |
| Above ethyl alcohol-moisturizing material-horn fat mixture | 10.0 |

EXAMPLE NO. 12

1000 grams of finely divided cleaned cattle horns were mixed with 10,000 grams of water and refluxed for 8 hours at 50° C. After this refluxing period, the water solution was filtered from the solids and 100 parts of the filtrate were mixed with 1000 parts of carbon tetrachloride to extract the fat and wax materials from the water solution. The mixture was refluxed at 45° C. for six hours.

After the refluxing, the water solution was separated from the carbon tetrachloride by a separation funnel. The water solution was then neutralized with ammonium hydroxide to bring the pH of the solution up to the value of 7.2. After neutralizing, the solution was filtered and the filtrate was concentrated to remove the water by evaporation. The resulting concentrated keratin extraction had a brown color and a consistency of tar.

1 gram of the extraction from the keratin structure was mixed with 9 grams of water to form an aqueous solution. 10 grams of the aqueous solution were then mixed with 90 grams of soap chips in a roller mill with suitable additions of perfume and color material and milled until the ingredients were evenly distributed. The resulting mass had a slightly yellow color and was then extruded and cut into segments or bars.

EXAMPLE NO. 13

100 grams of clean horse hair having the sebaceous fat previously removed were mixed with 1000 grams of water and refluxed at 55° C. for a period of 8 hours. The water solution was separated from the solid material by filtration, and an equal volume of carbon tetrachloride was mixed with the water solution and subsequently refluxed at 50° C. for 5 hours. The carbon tetrachloride was separated from the water solution by a separation funnel. The remaining water solution was concentrated by evaporation to provide the keratin extract.

100 grams of the keratin extraction were mixed with 900 grams of a 40% solution of 20% sodium lauryl sulfate and 20% sodium carbonate to form a slurry. The resulting slurry was then sprayed into a stream of warm air to form detergent particles upon evaporation of the water.

The water soluble or water and polar solvent soluble keratin extraction of the invention has a very low odor and is non-irritating to the skin. When employed in concentrations of 1 to 95% by weight of a cosmetic or pharmaceutical base, the extraction tends to absorb water and restores moisture to the corneum cells and provides the skin with a normal, moist appearance.

In the case of the present invention, the horn fat cooperates with the moisturing material, in that the horn fat will permit the free penetration of water vapors so that the water vapor can be absorbed and retained by the moisturizing material. However, the horn fat will prevent the water soluble keratin extraction or moisturizing material from being washed out of the skin and thereby the combination of the moisturizing material and the horn fat, when applied to the skin through a cosmetic vehicle, provides the skin with a balanced moisture input and output.

The effectiveness of the combination of the keratin extraction and soap in maintaining the moisture retaining characteristics in the skin s shown in the following tests:

*Test No. 1*

An area of human skin of about 70 square centimeters was washed with soap and rinsed with water. The skin area was then immersed in water for a period of about 20 minutes. After immersion, the water was blotted from the skin area and the corneum layer was then scraped from the skin area with a scalpel and weighed. After weighing, the corneum was dried and reweighed and the difference in weight was the moisture which the corneum had absorbed during the water immersion.

The skin sample which had been washed with soap and rinsed weighed 0.0075 gram after the water immersion and after drying weighed 0.0073 gram. This was a difference of 0.0002 gram or a water content of 2.50%.

A second skin area which had not been washed with soap nor rinsed was subjected to a similar water immersion test and the skin sample weighed 0.0125 gram. After drying, the sample weighed 0.0111 gram, thereby resulting in a water content of 0.0014 gram or about 11.20%.

This test showed that the soap wash and water rinse effectively removed the water soluble moisturizing materials from the corneum layer, and substantially impaired the ability of the skin to absorb water.

*Test No. 2*

Two skin areas of approximately 70 square centimeters were treated with a water-alcohol solution to remove the water soluble moisturizing materials. After treatment with the water-alcohol solution, the first skin area was washed with a 1% solution of a conventional soap and rinsed with a given volume of water. The second skin area was washed with a 1% soap solution of the invention and containing the keratin extraction and rinsed with a like amount of water.

After blotting the water from the skin areas, the corneum was scraped from the skin and in the case of the first skin area, which was washed with the conventional soap, the skin sample weighed 0.0100 gram before drying, 0.0097 gram after drying, leaving a water content of 0.0003 gram or 3.0%. In contrast to this, the second skin area, which was treated with the composition of the invention, weighed 0.0135 gram before drying, 0.0110 gram after drying, leaving a water content of 0.0025 gram or 18.5%.

As shown in this test, when the skin was subjected to washing with a conventional soap and rinsed with water, the skin, after the water immersion, had a moisture content of only 3.0%, while a similar skin area treated with soap and the keratin extract had a moisture content of 18.5%, which is substantially greater than that of the conventional soap.

The action of the keratin extraction in remaining on the skin after washing with the soap and rinsing with water is not fully understood. It would be expected that the keratin extraction, being water soluble, would be washed from the skin with the water rinse. However, through some unexplained circumstance, this situation is not true, for the keratin extraction, when combined with the soap or detergent, is deposited in the skin and is not washed from the skin by the soap or by the subsequent water rinse. This is completely unexpected when considering that an ordinary soap wash and water rinse will remove substantially all of the moisturizing materials from the skin, as shown in Test No. 1. However, when the keratin extraction is combined with soap or detergent, the water soluble keratin extraction will be deposited in the skin and will not be washed or removed therefrom.

Various modes of carrying out the invention are contemplated as being within the scope of the following claims particularly pointing out and distinctly claiming the subject matter which is regarded as the invention.

I claim:

1. A process of preparing a cosmetic or pharmaceutical product having the ability to absorb and retain moisture, comprising subjecting a keratin material selected from the group consisting of animal stratum corneum, animal horns, animal hoofs, animal nails and animal hair substantially free of sebaceous fat to the action of a solvent selected from the group consisting of water and an aqueous solution of a polar solvent for a time sufficient to extract the water soluble constituents from the keratin material in a solution of said solvent and at a temperature below 60° C. to prevent hydrolyzation and decomposition of the keratin material, separating the solution from the remaining keratin material, subjecting the solution to the action of a non-polar wax and fat solvent to extract the fat and wax materials from the solution, raising the pH of the solution to a value substantially greater than 7.5 by the addition of an alkaline material to said solution, lowering the pH of the solution to a value in the range of 7.0 to 7.5 by the addition of an acidic material to said solution, separating the water soluble constituents in said solution from said first named solvent, and mixing the water soluble constituents with a cosmetic base in the amount of 1% to 95% by weight of said base.

2. A process of preparing a moisturizing material to be used in a cosmetic product and having the ability to absorb and retain moisture when applied to the skin, comprising contacting the substantially pure keratin structure with a solvent selected from the group consisting of water and an aquous solution of a polar solvent at a temperature below 60° C. for a period of time sufficient to dissolve the water soluble constituents from the keratin structure and prevent decomposition and hydrolyzation of said keratin structure, adding an alkaline material to the solution of the water soluble constituents in said solvent to raise the pH of the solution to a value in the range of 7.0 to 7.5 to thereby precipitate the sulphur containing compounds from the solution, and thereafter separating the water soluble constituents from the solution.

3. A process of preparing and purifying a moisturizing material to be employed in a cosmetic or pharmaceutical product, comprising the steps of contacting a finely divided substantially pure keratin material with substantially pure water at a temperature in the range of 40° to 60° C. for a period of time sufficient to dissolve the water soluble constituents in the water and provide an aqueous solution, separating the solution from the remaining keratin material, raising the pH of the solution to a value substantially in excess of 7.5, lowering the pH of the solution to a value in the range of 7.0 to 7.5 to precipitate the skin irritating compounds from said solution, and concentrating said solution to provide a residue consisting essentially of said water soluble constituents, said water soluble constituents being characterized by the ability to absorb and retain moisture when applied to the skin in a cosmetic or pharmaceutical product and thereby provide the skin with a moist appearance.

4. A process of preparing and purifying a moisturizing material to be employed in a cosmetic or pharmaceutical product, comprising the steps of contacting finely divided substantially pure keratin with a media consisting essentially of an aqueous solution of a polar solvent at a temperature in the range of 40° to 60° C. for a period of time sufficient to dissolve the water soluble constituents from said keratin, said polar solvent being selected from the group consisting of ethyl alcohol, methyl alcohol, isopropyl alcohol, acetone and dioxane, separating the solution from the remaining keratin material, adding an alkaline material to the solution to raise the pH in excess of 7.5, adding an acidic material to the solution to lower the pH of the solution to a value in the range of 7.0 to 7.5 to precipitate the sulphur containing compounds from the solution, and thereafter concentrating the solution to provide a concentrated residue consisting essentially of the water soluble constituents, said water soluble constituents being characterized by the ability to absorb and retain moisture when applied to the skin in a cosmetic or pharmaceutical product.

5. A process of preparing and purifying a moisturizing material for use in a cosmetic or pharmaceutical product, comprising the steps of particalizing a substantially pure keratin material to provide finely divided keratin particles, contacting the keratin particles with an aqueous media at a temperature in the range of 40° to 60° C. for a period of time longer than 6 hours to dissolve the water soluble constituents from the keratin particles, said aqueous media being selected from the group consisting of substantially pure water and an aqueous solution of a polar solvent, separating the solution from the remaining keratin material, adjusting the pH of the solution to a value in the range of 7.0 to 7.5 to thereby precipitate the sulphur containing compounds from the solution, and thereafter separating the water soluble constituents from the solution with said water soluble constituents being characterized by the ability to absorb and retain moisture when applied to the skin in a cosmetic or pharmaceutical product.

6. A process of preparing and purifying a moisturizing material for use in a cosmetic or pharmaceutical product, comprising the steps of contacting substantially pure finely divided keratin with an aqueous media at a temperature in the range of 40° to 60° C. for a period of 6 to 12 hours to dissolve the water soluble constituents from the keratin, said aqueous media being selected from the group consisting of substantially pure water and an aqueous solution of a polar solvent, said aqueous media being employed in a weight ratio of about 7 to 10 parts to one part by weight of the keratin, separating the aqueous media from the remaining keratin material, adding an alkaline material to the aqueous media to raise the pH to a value above 7.5, adding an acidic material to the aqueous media to lower the pH to a value in the range of 7.0 to 7.5 to precipitate the sulphur containing compounds from the media, and concentrating the aqueous media to provide a residue consisting essentially of the water soluble constituents, said water soluble constituents being characterized by the ability to absorb and retain moisture when applied to the skin in a cosmetic or pharmaceutical product.

7. A cosmetic or pharmaceutical product, comprising from 1% to 95% of the water soluble extraction of a keratin material and the balance being a cosmetic base, said water soluble extraction being prepared by contacting the substantially pure keratin structure with a solvent selected from the group consisting of water and an aqueous solution of a polar solvent at a temperature below 60° C. for a period of time sufficient to dissolve the water soluble constituents from the keratin structure and prevent decomposition and hydrolyzation of said keratin structure, separating the solution from the remaining keratin material, and concentrating the separated solution to provide a residue consisting essentially of the water soluble constituents of said keratin material, said water soluble constituents being characterized by the ability to absorb and retain moisture when applied to the skin in the cosmetic or pharmaceutical product.

8. A cosmetic or pharmaceutical composition, comprising from 0.5 to 95.0% by weight of an additive and the balance being a cosmetic base, said additive consisting essentially of 5 to 95% by weight of a horn fat and the balance being a water soluble moisturizing material, said water soluble moisturizing material being produced by contacting a quantity of finely divided keratin with a solvent consisting essentially of water at a temperature in the range of 40° C. to 60° C. for a sufficient period of time to dissolve the water soluble constituents from the keratin, and evaporating the water to provide a concentrated residue consisting essentially of said water soluble moisturizing material.

9. A cosmetic or pharmaceutical composition, comprising from 0.5 to 95.0% by weight of an additive and the balance being a cosmetic base, said additive consisting essentially of 5 to 95% by weight of a horn fat and the balance being a water soluble moisturizing material, said water soluble moisturizing material being produced by contacting the substantially pure keratin structure with a solvent selected from the group consisting of water and an aqueous solution of a polar solvent at a temperature below 60° C. for a period of time sufficient to dissolve the water soluble constituents from the keratin structure and prevent decomposition and hydrolyzation of said keratin structure, adding an alkaline material to the solution of the water soluble constituents in said solvent to raise the pH of the solution to a value in the range of 7.0 to 7.5 to thereby precipitate the sulphur containing compounds from the solution, and thereafter separating the water soluble constituents from the solution.

10. A method of preparing an additive to be used in a cosmetic or pharmaceutical product and having the ability to absorb and retain moisture when applied to the skin, comprising contacting the substantially pure keratin structure with a solvent selected from the group consisting of water and an aqueous solution of a polar solvent at a temperature below 60° C. for a period of time sufficient to dissolve the water soluble constituents from the keratin structure and prevent decomposition and hydrolyzation of said keratin structure, separating the solution from the remaining keratin structure, concentrating the separated solution to provide a residue consisting essentially of the water soluble constituents of the keratin structure, and admixing said water soluble constituents with a horn fat with said water soluble constituents comprising from 5% to 95% by weight of the mixture, said water soluble constituents being characterized by the ability to absorb and retain moisture when applied to the skin in the cosmetic or pharmaceutical product and said horn fat serving to provide a balanced moisture input and output.

11. A method of preparing a cosmetic or pharmaceutical composition, comprising contacting a quantity of finely divided keratin with a solvent selected from the group consisting of water and an aqueous solution of a water soluble polar solvent at a temperature below 60° C. to dissolve the water soluble constituents from the keratin in said solvent, separating the solvent from the keratin, separating the water soluble constituents from the solvent, adding the water soluble constituents and a horn fat to a cosmetic base in a combined amount of 0.5 to 95.0% by weight of the base with the water soluble constituents and said horn fat each comprising from 5 to 95% by weight of the combined weight of the water soluble constituents and horn fat.

12. A soap composition, comprising from 0.1% to 75% by weight of the water soluble extraction of a keratin material and the balance being a soap, said water soluble extraction being prepared by contacting the substantially pure keratin structure with a solvent selected from the group consisting of water and an aqueous solution of a polar solvent at a temperature below 60° C. for a period of time sufficient to dissolve the water soluble constituents from the keratin structure and prevent decomposition and hydrolyzation of said keratin structure, separating the solution from the remaining keratin material, and concentrating the separated solution to provide a residue consisting essentially of the water soluble constituents of said keratin material, said water soluble constituents being characterized by the ability to absorb and retain moisture when applied to the skin in the cosmetic or pharmaceutical product.

13. A detergent composition, comprising from 0.1% to 75% of the water soluble extraction of a keratin material and the balance being a detergent, said water soluble extraction being prepared by contacting the substantially pure keratin structure with the solvent selected from the group consisting of water and an aqueous solution of a polar solvent at a temperature below 60° C. for a period of time sufficient to dissolve the water soluble constituents from the keratin structure and prevent decomposition and hydrolyzation of said keratin structure, separating the solution from the remaining keratin material, and concentrating the separated solution to provide a residue consisting essentially of the water soluble constituents of said keratin material, said water soluble constituents being characterized by the ability to absorb and retain moisture when applied to the skin in the cosmetic or pharmaceutical product.

References Cited in the file of this patent

UNITED STATES PATENTS

| | | |
|---|---|---|
| 415,208 | Johnson | Nov. 19, 1889 |
| 926,999 | Neuberg | July 6, 1909 |
| 1,608,686 | Weil | Nov. 30, 1926 |
| 2,459,708 | Sundgren | Jan. 18, 1949 |

FOREIGN PATENTS

| | | |
|---|---|---|
| 205,395 | Great Britain | Oct. 18, 1923 |
| 556,488 | Germany | Aug. 9, 1932 |

OTHER REFERENCES

Schimmel Briefs, Schimmel & Co., N.Y., No. 229, April 1954, No. 248, November 1955.

Wittka, Chem. Abstracts, A.C.S., vol. 37, 1943, p. 2203$^3$.

Schwartz et al.: Surface Active Agents, Interscience Pub. Co., N.Y., 1949, pp. 378, 514, 515.

U.S. Dispensatory, J. B. Lippincott, Phila., Pa., 24th ed., 1947, pp. 270, 271, 494–496, 1287–1289, 1947.

Hach's Chemical Dictionary, The Blakiston Co., Phila. 3rd ed., 1944, pp. 260, 788, Shelmire: J. Invest. Dermatology, 26:105–109, 1956.

Ser. No. 352,618, Wiechowski (A.P.C.), published Apr. 20, 1943.

Janistyn: Riechstoffe, Seifen, Kosmetika Dr. Alfred Huthig, Verlag, Heidelberg, 1950 Bank I, pp. 122, 193, 194, 204, 226, Bank II, pp. 388, 389.

Janistyn: Kosmetisches Practikum, H. Muhlberger, Augsburg, Germany, 1941, pp. 252–263.

Amer. J. of Pharmacy, May 1938, pp. 194–198.

UNITED STATES PATENT OFFICE
CERTIFICATE OF CORRECTION

Patent No. 3,033,755

May 8, 1962

Otto Karl Jacobi

It is hereby certified that error appears in the above numbered patent requiring correction and that the said Letters Patent should read as corrected below.

Column 1, line 56, for "scaley" read -- scaly --; column 2, line 39, for "adsorbed" read -- absorbed --; same line 39, for "adsorbs" read -- absorbs --; line 57, for "strurture" read -- structure --; column 3, line 47, for "thte" read -- the --; column 5, line 31, for "event" read -- even --; line 65, for "70°" read -- 70% --; column 6, line 9, for "40° " read -- 40° C. --; column 9, line 29, for "s" read -- is --; column 10, line 59, for "aquous" read -- aqueous --.

Signed and sealed this 4th day of September 1962.

(SEAL)
Attest:

ERNEST W. SWIDER
Attesting Officer

DAVID L. LADD
Commissioner of Patents